(12) United States Patent
Nichani

(10) Patent No.: US 6,563,324 B1
(45) Date of Patent: May 13, 2003

(54) SEMICONDUCTOR DEVICE IMAGE INSPECTION UTILIZING ROTATION INVARIANT SCALE INVARIANT METHOD

(75) Inventor: Sanjay Nichani, Natick, MA (US)

(73) Assignee: Cognex Technology and Investment Corporation, Natick, MA (US)

(*) Notice: Subject to any disclaimer, the term of this patent is extended or adjusted under 35 U.S.C. 154(b) by 99 days.

(21) Appl. No.: 09/727,888

(22) Filed: Nov. 30, 2000

(51) Int. Cl.$^7$ .............................................. G01R 31/02
(52) U.S. Cl. ..................... 324/537; 324/158.1; 324/754; 324/758
(58) Field of Search .............................. 324/501, 158.1, 324/537, 754, 758, 750, 751, 752; 382/145, 149, 151

(56) References Cited

U.S. PATENT DOCUMENTS

| | | | | |
|---|---|---|---|---|
| 5,113,565 A | * | 5/1992 | Cipolla et al. | 29/25.01 |
| 5,371,690 A | * | 12/1994 | Engel et al. | 364/570 |
| 5,495,537 A | * | 2/1996 | Bedrosian et al. | 382/209 |
| 5,640,199 A | * | 6/1997 | Garakani et al. | 348/87 |
| 5,640,200 A | * | 6/1997 | Michael | 348/87 |
| 5,740,274 A | | 4/1998 | Ono et al. | 382/190 |
| 5,757,198 A | * | 5/1998 | Shida et al. | 324/751 |
| 5,894,218 A | * | 4/1999 | Farnworth et al. | 324/158.1 |
| 5,949,901 A | | 9/1999 | Nichani et al. | 382/149 |
| 6,330,354 B1 | * | 12/2000 | Companion et al. | 382/150 |
| 6,316,950 B1 | * | 11/2001 | Denk et al. | 324/752 |
| 6,326,798 B1 | * | 12/2001 | Kuribara | 324/751 |
| 6,329,826 B1 | * | 12/2001 | Shinada et al. | 324/751 |
| 6,366,100 B1 | * | 4/2002 | Ito et al. | 324/750 |

OTHER PUBLICATIONS

David G. Lowe, "Object Recognition from Local Scale–Invariant Features" Proc. of International Cof on Computer Vision, Corfu, Sep. 1999, pp. 1–8.*

Fredric Guichard, "Morphological Affine and Galilean Invariant Scale–Space for Movies" IEEE Transactions on Image Processing, Mar. 1998, pp 444–456.*

Kenneth Tobin et al., "Automated Inspection" OE Magazine, Jul. 2001, pp 1–6.*

L.F.C. Lew et al., "Machine Vision" OE magazine, Jul. 2001, pp 1–2.*

AeroSense brochure, no date.*

Cognex brochure, 2002.*

Alberto Broggi, et al., "*A Morphological Model–Driven Approach to Real–Time Road Boundary Detection for Vision–Based Automotive Systems*", IEEE, 1994, pp. 73–80.

* cited by examiner

Primary Examiner—Marc S. Hoff
Assistant Examiner—T. R. Sundaram
(74) Attorney, Agent, or Firm—Brian Michaelis

(57) ABSTRACT

A method of inspecting semiconductor die and lead frame assemblies uses rotation invariant/scale invariant processing methods of machine vision data. A training image is acquired and processed to form a training model. A runtime image is acquired and processed using rotation invariant/scale invariant tools to find a runtime instance of the trained model and produce x, y, theta and scale information. The runtime instance is aligned to the train time model, or vice versa, and then compared to the train time model. The features and edges from the runtime image are compared to features and edges of the training model to identify discrepancies as possible defects. The possible defects are further processed with a morphological filter and/or a blob filter to further refine images of the defects. Alternative implementations of the invention measure adhesive wet-out around semiconductor dies and provide measurements of die rotation.

8 Claims, 8 Drawing Sheets

SEMICONDUCTOR DEVICE IMAGE INSPECTION UTILIZING ROTATION INVARIANT SCALE INVARIANT METHOD

FIELD OF THE INVENTION

The present invention relates to machine vision and more particularly to a machine vision method and apparatus for inspecting semiconductor die assemblies.

BACKGROUND OF THE INVENTION

Integrated circuits are typically assembled using automatic assembly equipment to pick and place a semiconductor die onto a lead frame component where it is usually secured by an adhesive such as epoxy. This process is called die bonding. The lead frame component includes conductive leads that provide external connections to the die. Automatic equipment bonds conductive wires between pads on the die and leads on the lead frame. Precise wire-bonding operations rapidly connect a large number of very small and closely spaced pads to respective leads on the lead frame. Once a wire bonding operation is complete, the die and connective wires are typically encapsulated or enclosed in an insulating package.

Semiconductor die assembly components and manufacturing operations are very expensive so it is important to inspect the surfaces of the semiconductor die after die bonding. This process is called post bond inspection. Deposits of unwanted adhesive on the die are among the most commonly occurring die bonding defects. Such adhesive deposits can effectively "short circuit" the semiconductor die's electronic functions because the adhesive is typically conductive. Electrical testing of a final assembly would detect such short circuits but only after significant additional manufacturing costs have been incurred.

The inspection of semiconductor dies for adhesive has proven to be a vexing machine vision problem. This is a result of the complexity of the background, i.e., the circuitry pattern etched into the layers of the die. Furthermore a die may be rotated and/or shifted by a significant amount when the die and adhesive are placed onto the lead frame, due to lack of fixturing. Such rotation or shifting complicates inspection by a machine vision system because the machine vision system must first find the die.

A semiconductor die is not generally fixtured when it is assembled to a lead frame so it must be first located by any machine vision inspection system prior to its inspection. Machine vision inspection systems must typically perform an alignment procedure to compensate for shifting and rotation prior to performing an inspection operation. Alignment procedures according to the prior art, like the ones using normalized correlation, are configured to only find translation (2 D.O.F.). To find rotation, two models are trained, typically as far apart as possible, to increase accuracy. By determining the two positions, the rotation component can be computed. However, if the rotation is excessive the position may not be found. This procedure involves training a model in a reference image and then finding it within a region of interest in the runtime image. Fiducials may be provided on the reference object to increase the accuracy and efficiency of the alignment procedure. An alignment procedure that is used in semiconductor die inspection typically recognizes and locates two opposite corners of a die under inspection and two opposite corners of the lead frame. The machine vision inspection system can then compute the shift and rotation of the semiconductor die relative to its train-time position.

Methods according to the prior art have limited tolerance to rotation. For example certain of such methods can tolerate up to 10 degrees or 15 degrees of rotation but at the cost of reduced accuracy. Alternatively, numerous incrementally rotated reference images could be stored, but such methods are inefficient because they consume excessive memory and processor resources. Such methods decrease system accuracy and are inefficient because they consume excessive memory and processor resources.

The prior art suggests the use of a technique referred to as golden template comparison (GTC) to inspect die surfaces. GTC is a technique for locating objects by comparing a feature under scrutiny (to wit, a die surface) to a good image—or golden template—that is stored in memory. The technique subtracts the good image from the test image and analyzes the difference to determine if the unexpected object (e.g., a defect) is present. For example, upon subtracting the image of a good die surface from a defective one, the resulting "difference" image would reveal an adhesive blotch that could be flagged as a defect.

Before GTC inspections can be performed, the system must be "trained" so that the golden template can be stored in memory. To this end, the GTC training functions are employed to analyze several good samples of a scene to create a "mean" image and "standard deviation" image. The mean image is a statistical average of all the samples analyzed by the training functions. It defines what a typical good scene looks like. The standard deviation image defines those areas on the object where there is little variation from part to part, as well as those areas in which there is great variation from part to part. This latter image permits GTC's runtime inspection functions to use less sensitivity in areas of greater expected variation, and more sensitivity in areas of less expected variation.

At runtime, a system employing GTC captures an image of a scene of interest. Where the position of that scene is different from the training position, the captured image is aligned, or registered, with the mean image. The intensities of the captured image are also normalized with those of the mean image to ensure that the variations in illumination do not adversely affect the comparison.

The GTC inspection functions then subtract the registered, normalized, captured image that contains all the variations between the two. That difference image is then compared with at "threshold" image derived from the standard deviation image. This determines which pixels of the difference image are to be ignored and which should be analyzed as possible defects. The latter are subjected to morphology, to eliminate or accentuate pixel data patterns and to eliminate noise. An object recognition technique, such as connectivity analysis, can then be employed to classify the apparent defects.

Although GTC inspection tools have proven quite successful, they suffer some limitations. For example, except in unusual circumstances, GTC requires registration—i.e., that the image under inspection be registered with the template image. GTC also used a standard deviation image for thresholding, which can result in a loss of resolution near edges due to high resulting threshold values. GTC is, additionally, limited to applications where the images are repeatable: it cannot be used where image-to-image variation results from changes in size, shape, orientation and warping. Furthermore GTC methods disadvantageously tolerate rotation only by inefficiently storing a set of rotated referenced images as previously described.

In application to die surface inspection, GTC is further limited because its fixed template typically does not include the die edges because edges are not generally repeatable with the necessary precision from die-to die due to manufacturing machinery sawing tolerances. It is here, however, that the probability of deposited adhesive is very high. Moreover, the complexity of the etching patterns on the die surfaces results in large area being effectively masked by the high standard deviation. Therefore, GTC methods are generally incapable of inspecting the fine detail of typical semiconductor die surfaces.

An improved method of inspecting semiconductor dies is taught in U.S. Pat. No. 5,949,901 which is incorporated herein by reference in its entirety. The method according to U.S. Pat. No. 5,949,901 (the '901 invention) includes the steps of generating a first image of the die (including, the patterns etched into its surface and any other structures—together, referred to as the "die," or "die surface" or "background"), generating a second image of the die and any defects thereon, and subtracting the second image from the first image. The method is characterized in that the second image is generated such that subtraction of it from the first image emphasizes a defect (e.g., excessive adhesive) with respect to the die or background.

In related aspects of the '901 invention, the second step is characterized as generating the second image such that its subtraction from the first image increases a contrast between the defect and the background. That step is characterized in still further aspects of the '901 invention, as being one that results in defect-to background contrast differences in the second image that are opposite polarity from the defect-to-defect contrast differences in the first image.

In further aspects, the '901 invention calls for generating a third image with the results of the subtraction and for isolating the expected defects on that third image. Isolation can be performed according to other aspects of the '901 invention, by conventional machine vision segmentation techniques such as connectivity analysis, edge detection and/or tracking, and by thresholding. In the latter regard, a threshold image—as opposed to one or two threshold values—can be generated by mapping image intensity values of the first or second image. That threshold image can then be subtracted from the third image (i.e., the difference image) to isolate further the expected defects.

Still further objects of the '901 invention provide for normalizing the first and second images before subtracting them to generate the third image. In this aspect, the invention determines distributions of intensity values of each of the first and second images, applying mapping functions to one or both of them in order to match the extrema of those distributions. The first and second images can also be registered prior to subtractions.

According to further aspects of the '901 invention, the first and second images are generated by illuminating the die surface with different respective light or emission sources. This includes, for example, illuminating it with direct, on-axis lighting to generate the first image, and illuminating it with diffuse, off-access or grazing light to generate the second image. Additional aspects of the '901 invention provide methods incorporating various combinations of the foregoing aspects. Although generally accurate under certain circumstances, each embodiment of the '901 invention has disadvantages in certain other circumstances as described below along with disadvantageous of other prior art.

During die bonding manufacturing operations, a particular quantity of epoxy must be used to secure a die to a lead frame. As previously discussed, excess epoxy would frequently contaminate the surface of the die thereby reducing yield by causing short circuits on the die or by interfering with wire bonding to the die pads. Contrarily, bonding between the die and the lead frame may not be strong enough if too little epoxy is used. Measurement of the width of an adhesive bead surrounding a semiconductor die ("adhesive wet-out" or "AWO") is a common method of confirming that a proper quantity of adhesive is used to secure a die to a lead frame. A bead width measurement that exceeds a specified limit indicates that too much adhesive was deposited. Measurement of a thin bead or detection of an adhesive void indicates that too little adhesive was deposited. Such measurements require finding the edges of the die.

Methods according to the prior art do not explicitly find the edges of the die. They assume the die to be of a fixed size even though the die may be a somewhat different size, for example, if the die was improperly diced. Therefore it also desirable to provide scale information along with displacement and rotation information that is necessary to perform adhesive wet-out measurements. Methods according to the prior art generally do not provide such scale information.

Non-linear variations in an image occur, for example, when lighting or other process variables are changed. A changing appearance of a reflection or refraction patterns on a semiconductor die may be caused by even slight tilting of the die. The methods according to the prior art that are previously discussed are embodiments of area based inspection techniques. Such area based techniques are ill suited to process images having such non-linear variation.

Although certain semiconductor die inspection methods according to the prior art may be generally accurate and efficient in many circumstances they have disadvantages in other circumstances. For example, a system that requires multiple light sources may be prohibitively expensive because additional costs are incurred in designing the lighting arrangement, purchasing and installing the additional lighting source. Furthermore, such systems may require additional registration procedures to be performed if a die has moved between acquisition of a first and a second image.

The methods according to the prior art are incapable of tolerating any substantial rotation of a die under inspection. Such a limitation is particularly disadvantageous for use in certain manufacturing equipment wherein substantial rotation of a die is a common occurrence. Furthermore the methods according to the prior art detect rotation of die by operating on at least two specific areas, typically opposite corners, of the die. Such a multiple point method of detecting rotation requires generation, storage and processing of multiple models and thereby increases processing time and wastes processor and memory resources.

SUMMARY OF THE INVENTION

The present invention provides a machine vision method of inspecting an object of manufacture which is tolerant to scale and rotation variations of the object. More particularly, the present invention provides a method of inspecting a semiconductor die surface for defects, inspecting lead areas of a semiconductor lead frame for defects and inspecting adhesive wet-out surrounding a semiconductor die in a lead frame assembly.

A training image is acquired and a training model is generated which may include an entire die at a coarse resolution or a specific region of interest at a finer resolution. A runtime image is acquired and compared with the training model using Rotation Invariant, Scale Invariant (RISI) tools to produce a measurement of rotation angle and scale of the runtime image relative to the training model. The RISI tool uses a one-point alignment method to measure the rotation angle and scale of the runtime image. The high accuracy angle measurement may be input to an Affine Transform component which rotates the training model relative to the runtime image or which rotates the runtime image relative to the training model. The post-transform runtime image is then inspected for defects by comparing it to the training model and seeking discrepancies between the two. Optionally, a GTC operation may be performed in parallel with the post-transform comparison and the results of each comparison may be merged. The results of the comparison (s) may be input to a morphological filter and/or a blob filter to eliminate noise and to accentuate features.

Accurate measurement of the width of an epoxy bead surrounding the semiconductor die requires knowledge of the true scale of the die in the runtime image. The scale measurement output from the RISI tool may be used to aid accurate measurement of adhesive wet out (AWO).

The method according to the present invention may be implemented to inspect semiconductor dies within a lead frame assembly or to inspect the lead frame assembly, or both.

Features of the present invention include improved methods for machine vision, and more particularly, improved methods for inspecting surfaces of semiconductor dies and lead frames. Increased accuracy and efficiency is achieved by operating on geometric attributes such as edges, boundaries and features rather than pixel based attributes such as those used in GTC, or normalized correlation methods. The invention features increased alignment accuracy, robustness, and tolerance to non-linear image variations because it applies edge based image-processing techniques. The invention also features improved inspection sensitivity because it does not mask areas of high frequency variation. The increased accuracy of alignment provided by the present invention is also at least partly due to use of geometric matching as opposed to pixel based schemes.

Further features of the present invention include a method of inspecting semiconductor die surfaces for defects using a minimum amount of inspecting equipment and having minimum setup requirements. For example, the methods according to the present invention do not require design and setup of multiple lighting sources.

The present invention also features a method of inspecting semiconductor dies and lead frames that is tolerant to variation in component rotation and scale. The present invention increases capability and efficiency of rotation and scale compensation because it does not require generation and storage of extra incrementally rotated models. The invention also increases efficiency by operating on a single point (local area) to determine alignment and angle of rotation thereby eliminating any need for a processing a second alignment point.

Additional features of the invention include a method of determining and using scale information of an image to locate a semiconductor die relative to a lead frame. The invention also features a method of using scale information to accurately measure adhesive wet-out.

BRIEF DESCRIPTION OF THE DRAWINGS

These and other features of the present invention will be better understood when reading the following description taken together with the accompanying drawings.

DETAILED DESCRIPTION OF THE INVENTION

Figure 1:
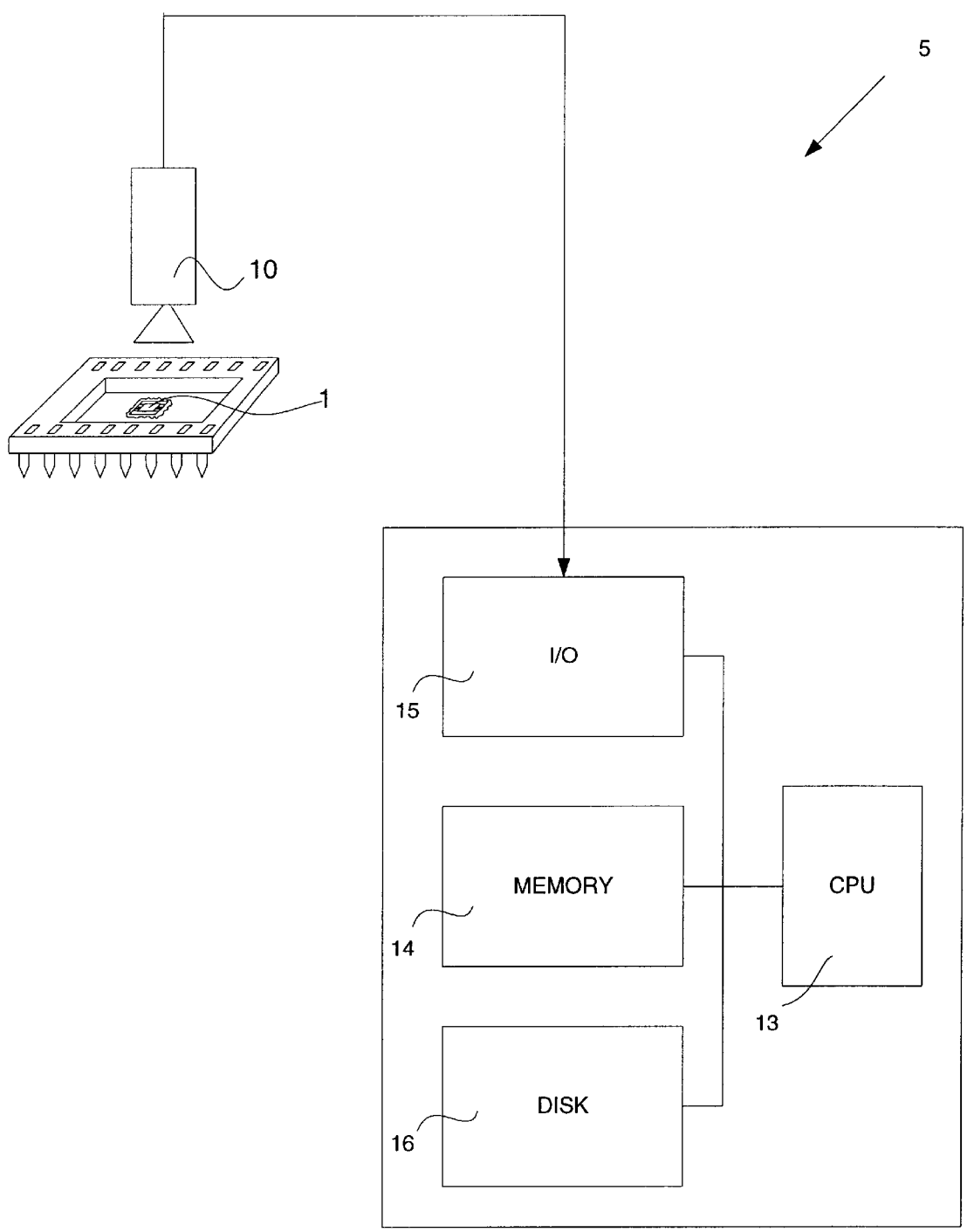
FIG. 1 is a schematic diagram of a machine vision inspection system according to at least one embodiment of the present invention.

FIG. 1. illustrates a system 5 for inspecting a semiconductor die surface in accord with the invention. The system 5 includes a capturing device 10, such as a conventional video camera (such as the Sony XC75 camera with a 50 mm COSMICAR lens) or scanner, that generates an image of a semiconductor die 1. Image data (or pixels) generated by the capturing device 10 represent, in the conventional manner, the image intensity (e.g., color or brightness) of each point in the scene at the resolution of the capturing device.

The digital image is transmitted from the capturing device 10 via a communications path 11 to an image analysis system 12. This can be a conventional digital data processor or a vision processing system (such as the Cognex 5400) of the type commercially available from the assignee hereof, Cognex Corporation, programmed in accord with the teachings hereof to perform image segmentation. The image analysis system 12 may have one or more central processing units 13, main memory 14, input-output system 15, and disk drive (or other mass storage device) 16, all of the conventional type.

At least one embodiment of the present invention automatically inspects semiconductor dies 1 for defects using a machine vision system. Illustrative embodiments detect typical defects including adhesive deposits on the die surface, broken or chipped dies, improperly cut dies, and defective etch patterns on the die. Lead frames 20 may also be inspected for defects using a machine vision system according to the invention. Typical defects that may be found on lead frames 20 are contaminated lead pads 27, improperly formed leads or improperly formed frame components.

A training procedure is executed to obtain a model of a known good object that will be used for comparison to runtime models of an object under inspection. The known good object is presented to an image capture device 10 and at least one image of the object is acquired and stored in memory of an image analysis system 12. The image is typically comprised of conventional image data defining the intensity of a set of image pixels wherein the number of pixels depends upon the resolution of the image capture device. The image analysis system operates on the image of the known good object to generate a training model 44 that is stored for comparison with runtime objects under inspection. The training model 44 typically comprises geometric attributes such as edges boundaries or features and may be generated using any number of pattern finding methods known in the art, including PatMax, which are available from the assignee hereof, Cognex Corporation. The same capture device 10 and image analysis system 12 may be used to inspect run time objects once the training procedure is completed.

The system 12, and more particularly, the central processing unit 13, is configured by programming instructions according to the teachings hereof for image segmentation, as described in further detail below. Those skilled in the art will appreciate that, in addition to implementation on a programmable digital data processor, the methods and apparatus taught herein can be implemented in special purpose hardware.

Figure 2A:
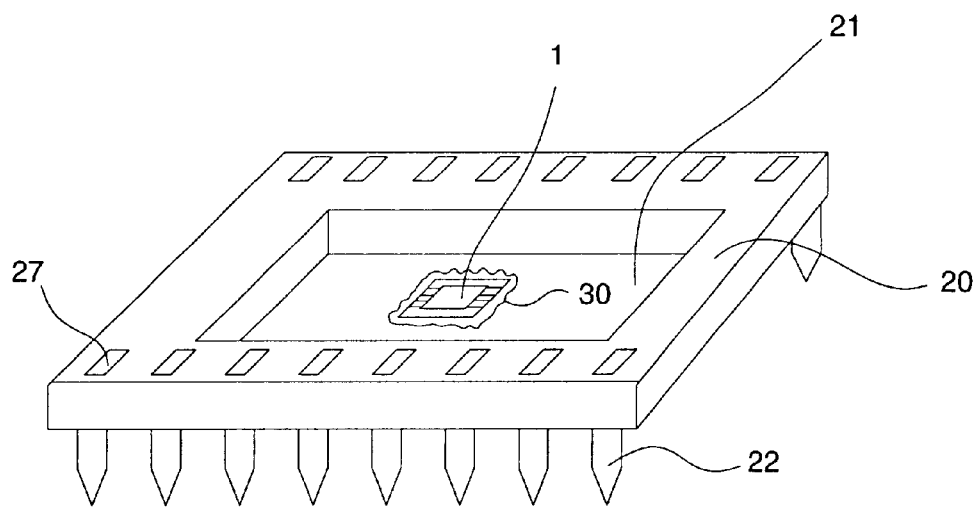
FIGS. 2A and 2B are perspective views of a lead-frame/die assembly according to at least one embodiment of the present invention.
Figure 2B:
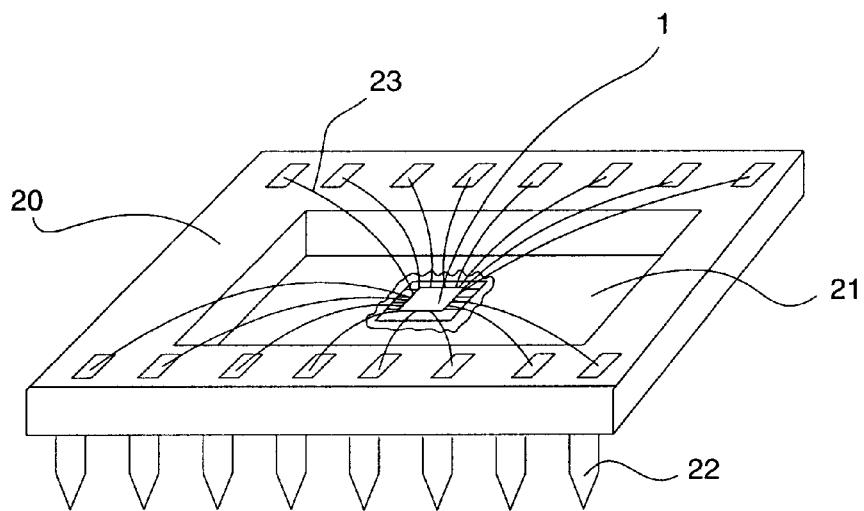

FIG. 2A illustrates a lead frame 20 subassembly having a die 1 disposed thereon and secured there by an adhesive 30 which is typically epoxy. The lead frame 20 typically includes a chip cavity 21 on its top surface. During assembly, a precisely controlled volume of adhesive 30 is placed in the chip cavity 21. An automatic pick and place machine typically disposes the die 1 onto the lead frame secured with adhesive 30 therebetween. Some of the adhesive generally flows out around the sides of the die. Although many types of pick and place machines exist, having many type of component grippers, it is common to employ pick and place machines having vacuum gripping devices to assemble small fragile components such as semiconductor dies 1. Such vacuum gripping devices do not provide precise positive orientation of the die 1 relative to the lead frame 20. The die 1 may rotate as it being picked up by a vacuum gripper or it may shift or rotate after a vacuum gripper releases it onto the lead frame 20. The presence of a fluid adhesive 30 such as uncured epoxy between the die 1 and the lead frame 20 increases the die's 1 tendency to shift or rotate.

Figure 3A:
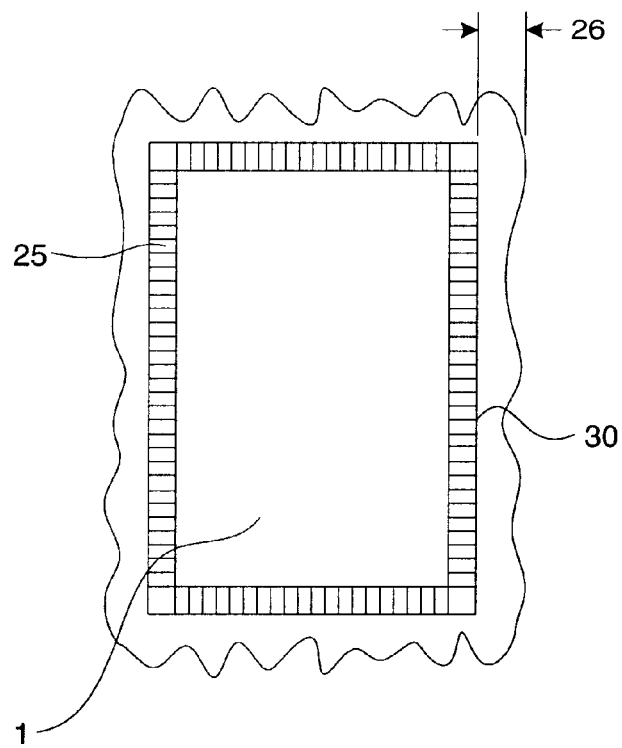
FIGS. 3A and 3B are top views of a die and adhesive wet-out according to at least one embodiment of the present invention.

After the die 1 is placed onto the lead frame 20 with a correct quantity of adhesive 30, a bead of adhesive 30 is typically visible as an adhesive wet-out pattern around the perimeter of the die 1. FIG. 3A illustrates an adhesive wet-out (AWO) pattern having a width 26. In at least one embodiment of the present invention, the width 26 of the wet-out pattern is measured to detect that a correct quantity of adhesive 30 is present.

Figure 3B:
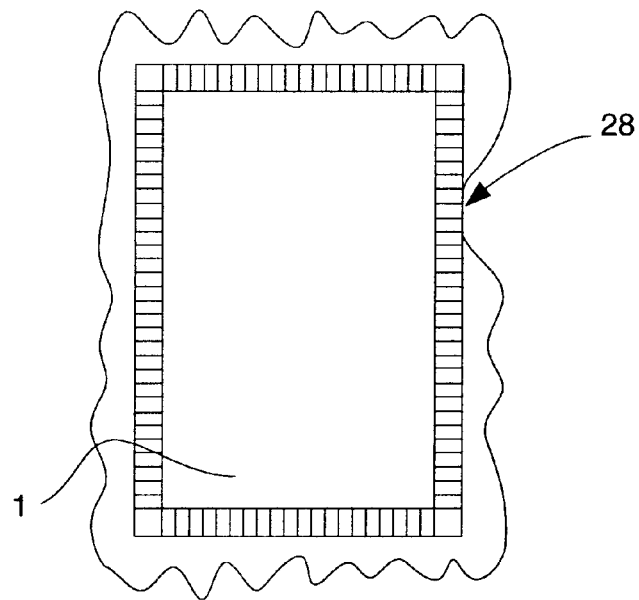

An insufficient quantity of adhesive 30 is indicated by an AWO width 26 measurement that falls below a specified limit or by the presence of voids 28 in the adhesive 30. FIG. 3B illustrates an AWO void 28. At least one embodiment of the present invention detects insufficient quantities of adhesive 30 by detecting low AWO widths 26 and adhesive voids 28 in the area surrounding a die 1. Alternatively, too much adhesive can be bad and needs to be measured.

Certain embodiments of the present invention are particularly advantageous for measuring and inspecting adhesive wet-out (AWO) around the perimeter of a semiconductor die 1 on lead frame 20. Accurate AWO measurements can be used to precisely control adhesive dispensing equipment so that a proper amount of adhesive 30 is used to secure a semiconductor die 1 to a lead frame 20. Dispensing an incorrect volume of adhesive 30 significantly increases defects and thereby reduces manufacturing yields. Manufacturing yields can be therefore be substantially increased by monitoring AWO and controlling adhesive dispenser volume settings.

The scale of a runtime image 46 relative to the actual object under inspection must be known in order to extract actual measurements from the runtime image 46. In the illustrative embodiment of the invention according to FIG. 5, scale information 64 is communicated from the RISI component 48 to an adhesive wet-out measurement component 66. The adhesive wet-out measurement component 66 is then capable of identifying adhesive 30 in an image and determining whether the quantity of adhesive 30 falls within acceptable limits.

Figure 3C:
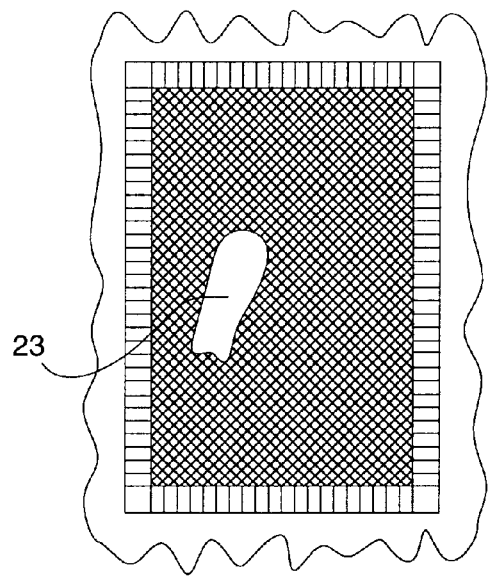
FIG. 3C is a top view of a die surface subject to a die surface check according to at least one embodiment of the present invention.

An illustrative embodiment of the present invention may also include die surface checks (DSC) wherein a die surface is inspected for defects after it is assembled to the lead frame. FIG. 3C illustrates a die surface having an adhesive deposit 23. Such adhesive deposits cause the assembly to be defective and are advantageously detected according to the illustrative embodiment before further processing costs are incurred.

Figure 3D:
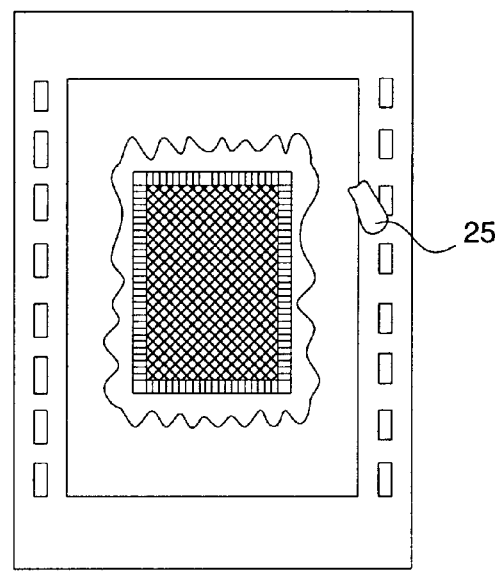
FIG. 3D is a top view of a die and lead frame assembly subject to a lead area check according to at least one embodiment of the present invention.

Another illustrative embodiment of the present invention may include lead area checks (LAC) wherein the lead areas of the lead frame 20 are inspected for defects. FIG. 3D illustrates a lead frame/die assembly having an adhesive deposit 25 on the lead area. The illustrative embodiment would recognize when such a defect exists in the lead area and causes the assembly to be rejected before further processing costs are incurred.

Figure 4:
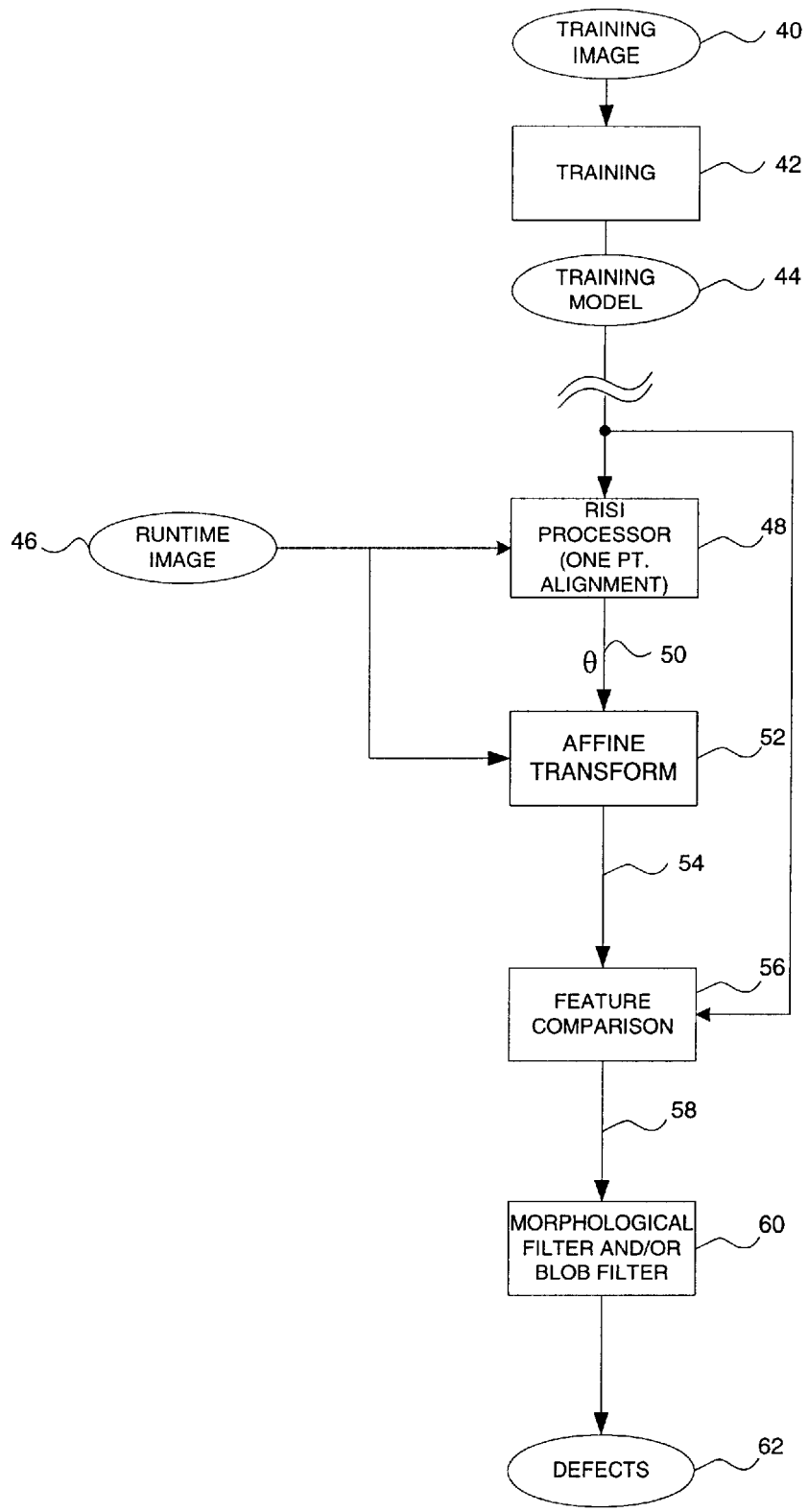
FIG. 4 is a block diagram of the steps of a machine vision inspection system according to at least one embodiment of the present invention.

FIG. 4 is a schematic flow diagram of the steps according to at least one embodiment of the present invention. The steps according to FIG. 4 may be performed by the image analysis system 12. A training image 40 is acquired during a training phase of system operation using a capturing device 10 described above. The training image 40 is communicated to a training model component 42 along with additional parameters such as information specifying an area of interest, and a resolution specification. The training model component 42 processes the raw image data by performing any necessary smoothing and sub-sampling operations to provide a training model 44 comprising geometric attributes such as boundary points, edges or features. Persons of ordinary skill in the art will appreciate that the training step does not occur during each iteration of inspection of the present invention. Rather, the training steps may be performed only once or a small number of times for very many iterations of the runtime steps of the invention.

A runtime image 46 is then acquired during a runtime phase of system operation using the capturing device 10. Both the runtime image 46 and the training model 44 are communicated to an RISI processor component 48. The RISI processor component performs a one point alignment of the runtime image 46 relative to the training model 44 and generates a measurement of relative translation (x, y) and angular displacement (theta) 50 between them. Although a particular embodiment of the invention is described including an RISI processor component, it should be understood that any number of geometric processing methods may be used to generate translation, scale or rotation information.

During a manufacturing process (runtime) the invention inspects objects of manufacture by comparing them with the training model 44. The objects of manufacture are individually presented to the image capture device 10 which then acquires an image of the object and communicates it to the image analysis system 12. Before a runtime image 46 is compared to the training model 44, the invention uses RISI tools, such as Patmax available from Cognex Corporation or similar tools, to determine the translation and angular orientation of the object. This is a particularly important step during semiconductor die 1 assembly to a lead frame 20 because semiconductor dies 1 are often rotated by substantial amount relative the training time. RISI tools efficiently determine differences in scale and rotation between the training model 44 and the object under inspection.

According to at least one embodiment of the invention, an RISI processor component 48 determines the component translation (x, y) and rotation (relative angular displacement 50) using a one point alignment method. According to the one point alignment method, the RISI processor considers only one small area of the object under test to compute its rotation. One small area of the object is modeled during a training phase and a runtime image of the region of interest around the nominal position, typically the train time position, is processed to find training model an appropriate x, y, and theta. It is unnecessary to train and find two separate areas such as opposite corners, as is known in the art to compute rotation by comparing the relative positions of the two areas, because RISI tools output rotation information by operating on a single area. The one point alignment method conserves significant processor resources, especially when compared to multiple point model rotation methods of the prior art. These tools not only measure rotation (theta) accurately but provide an accurate translation (x, y) under rotation.

Once the angle of rotation of the object under test is known, the image of the object is presented to an affine transform component 52 along with its relative angular displacement 50. The affine transform component 52 performs transforms of the type that are well known in the art to rotate the image of the object under test so that it matches the orientation of the training model 44 and generates a rotated image data structure 54. The image of the object under test is then compared to the training model 44 using any number of comparison methods known in the art to distinguish differences between the two and flag the differences as possible defects 58. Any potential defects are further processed by at least one filter component to eliminate noise and accentuate images of the defects. In at least one embodiment, the filter component includes a morphological filter. In still another embodiment, the filter includes a blob filter.

The rotated image data structure 54 and the training model 44 are both communicated to a comparison component 56 which identifies certain differences between them as potential defects 58. The differences may include edges and/or features that are missing or that have newly appeared. The comparison component 56 communicates the potential defects 58 from the rotated image data structure 54 to a filter component 60. The filter component 60 performs a morphological transform and/or a blob filter on the potential defects 58 to reduce noise and generate a refined model of the defects 62. The refined model of the defects 62 can be further processed for external conditions appropriate to the application such as actuating a mechanical or electrical reject device, adjusting processing for subsequent units, or compiling quality control statistics.

The comparison step according to the invention may comprise a single comparison method or any number of combinations of comparison methods. For example, in at least one embodiment of the present invention, as illustrated in FIG. 7, a golden template comparison GTC is performed on a rotated image 54 of the object under test, wherein the GTC is performed in parallel with any other comparison method for distinguishing features and edges between images.

Figure 5:
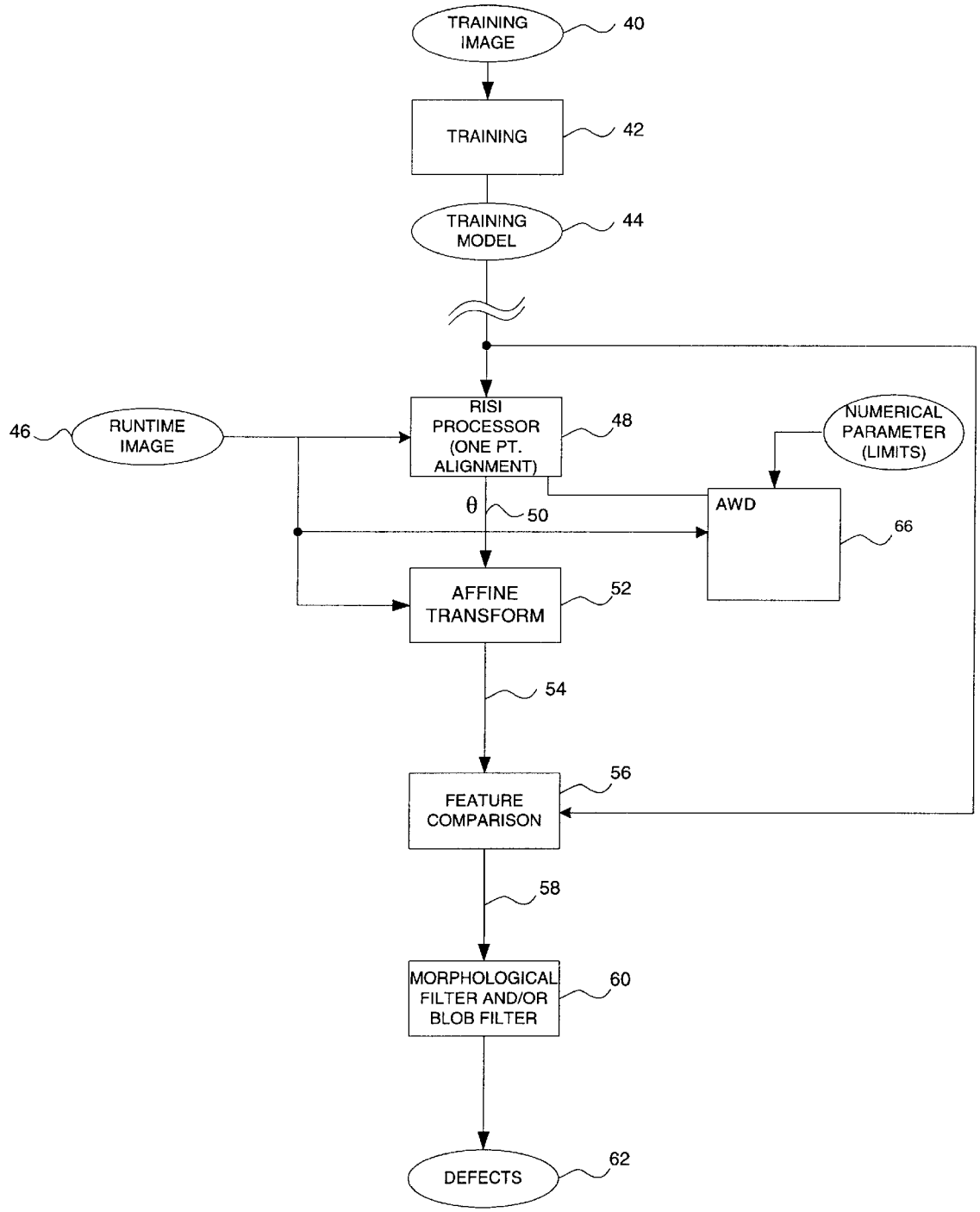
FIG. 5 is a block diagram of the steps of a machine vision inspection system according to an embodiment of the invention including adhesive wet-out measurement steps.

FIG. 5 is a schematic flow diagram of the steps according to an alternative embodiment of the invention. Scale information 64 is generated by the RISI component 48 along with a relative angular displacement 50 as previously discussed. Embodiments according to the invention inspect adhesive wet-out as a method of process control to determine whether the correct amount of adhesive 30 is deposited on the lead frame 20. One method of performing such inspections is to perform an actual measurement of the width 26 of the adhesive bead at various positions around the perimeter of a semiconductor die 1. Such measurements require accurate knowledge of the scale of the runtime image 46 to find the edge of the die. Such scale information is standard output of typical RISI tools known in the art. The embodiment according to FIG. 5 communicates scale information 64 from the RISI tool 48 to an adhesive wet-out measuring component 66. A runtime image 46 and wet-out width limit data 65 are also communicated to the AWO measuring component. The adhesive wet-out measuring component 66 may then determine whether a correct quantity of adhesive is present by determining whether the adhesive bead surrounding the die 1 has a correct width within defined limits 65.

Figure 6:
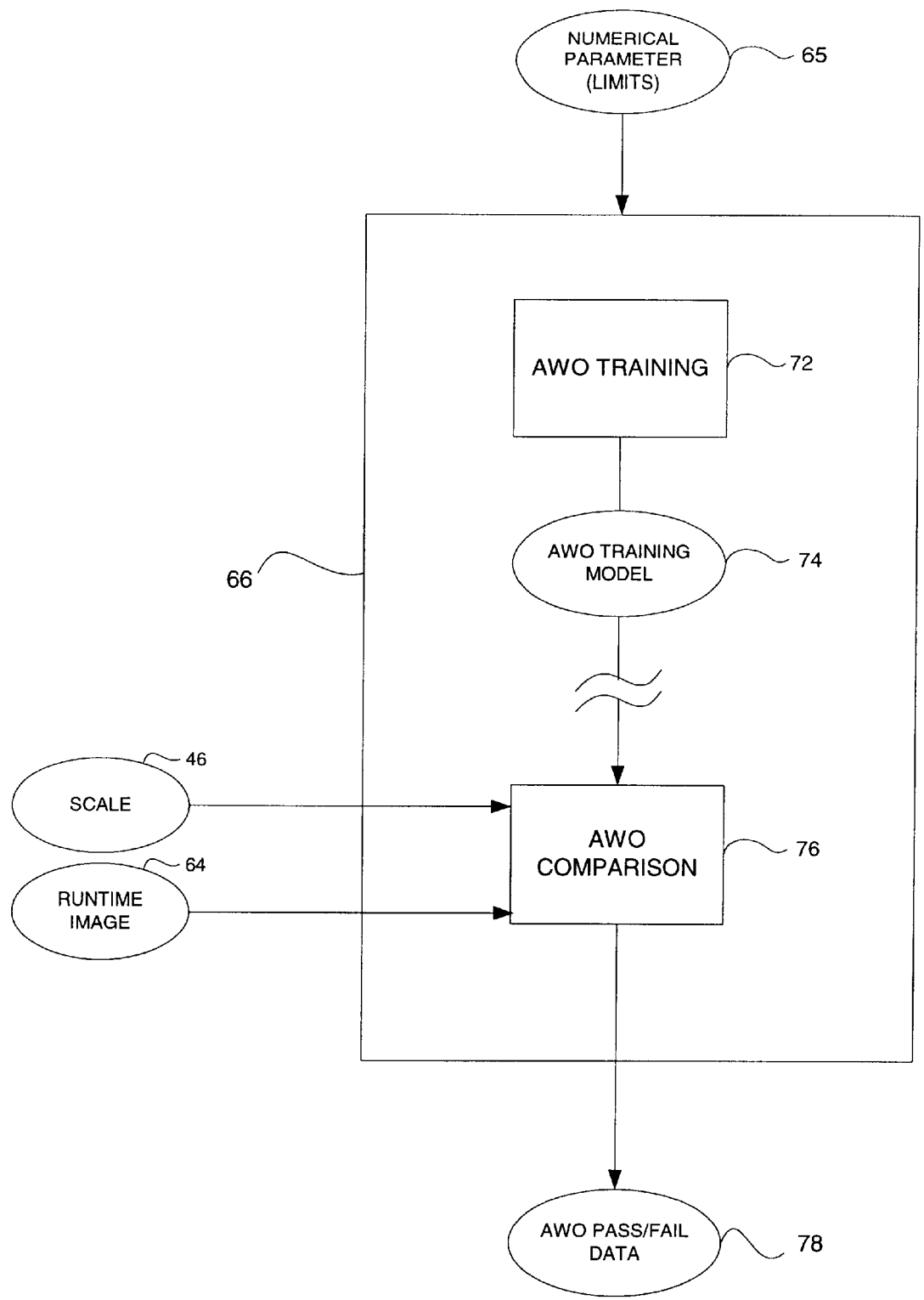
FIG. 6 is a block diagram of the steps of adhesive wet-out measurements according to at least one embodiment of the invention.

FIG. 6 is a schematic flow diagram of the steps of an adhesive wet-out component measurement according to at least one embodiment of the present invention. Preselected numerical parameters 65 may define acceptable limits for adhesive wet out width 26. The training image 40 and the numerical parameters are input to an AWO training component 72 to generate an AWO training model 74. The AWO training model 74 may include representations of acceptable boundaries to define maximum and minimum limits for the AWO according to a properly tuned manufacturing process. The AWO training model 74, the runtime image 46 and the image scale 64 are input to an AWO comparison component 76. The AWO comparison component 76 accounts for image scale 64 and compares the runtime image 46 with the AWO training model 74 to determine if AWO is within acceptable limits. The AWO comparison component 76 then may provide AWO evaluation data such as AWO pass/fail data 78 which may be used to activate an alarm condition or to adjust adhesive dispensing equipment, for example. In an alternative embodiment the AWO component 66 may measure the AWO width 26 to provide numerical feedback to an adhesive dispensing system.

Figure 7:
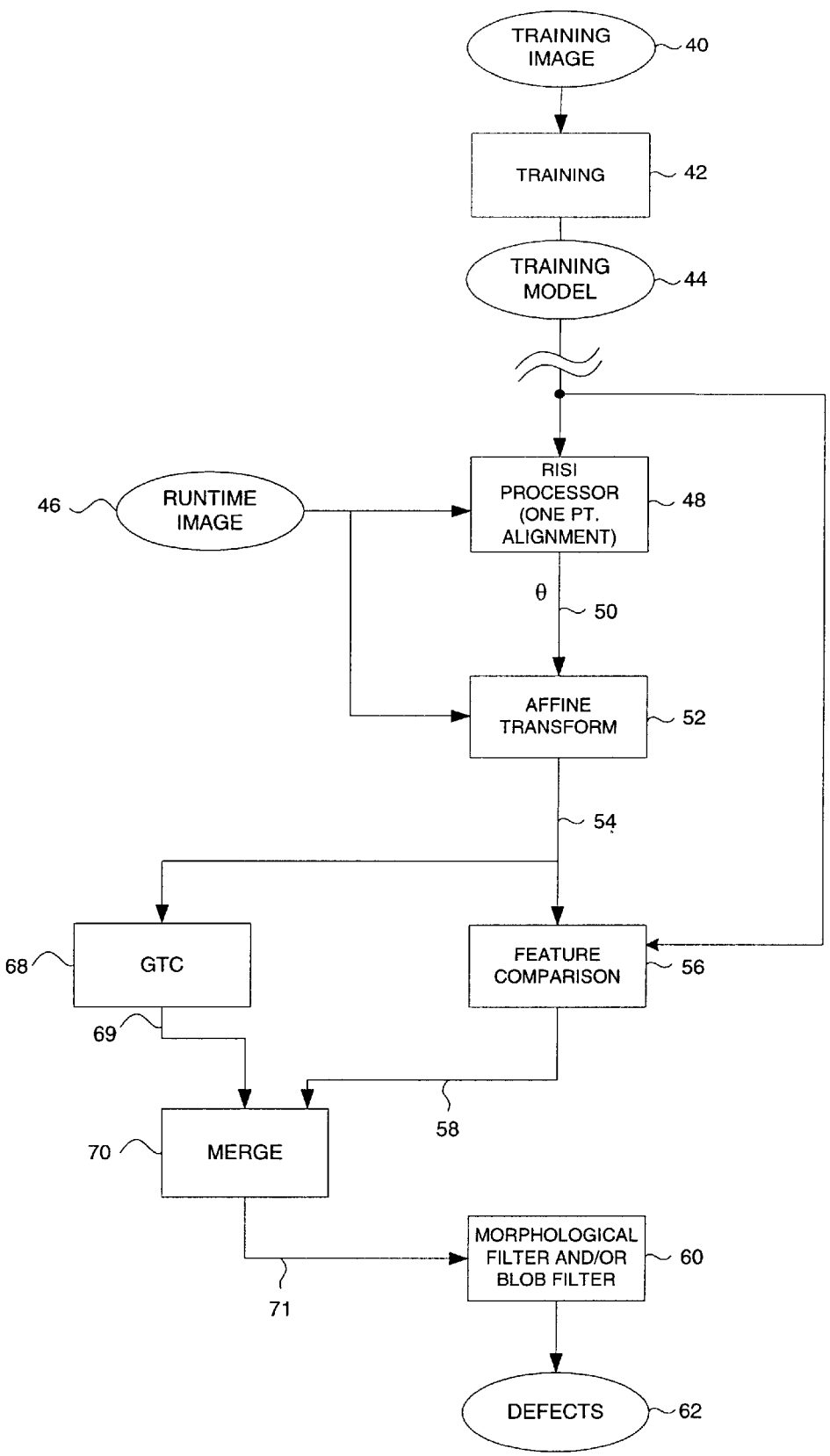
FIG. 7 is a block diagram of the steps of a machine vision inspection system according to an embodiment of the invention including a parallel global template comparison step.

FIG. 7 is a schematic flow diagram of the steps according to another alternative embodiment of the present invention having a golden template comparison component 68. The rotated image data structure 54 is communicated to a GTC component 68 in parallel with the comparison component 56. The GTC component 68 generates a list of potential defects 69 which is combined at a merge component 70 with a list of potential defects 58 from the comparison component 56. The combined potential defects 71 are then communicated to the filter component 60 for noise reduction and refinement, to generate a set of data representing the defects (a refined model of the defects 62) for further processing.

Although the invention is described hereinbefore with respect to illustrative embodiments thereof, it will be appreciated that the foregoing and various other changes, omissions and additions in the form and detail thereof may be made without departing form the spirit and scope of the invention. For example, although the invention is described with respect to semiconductor die assemblies, persons having ordinary skill in the art will appreciate that methods and apparatus according to the present invention may be easily applied to inspecting and analyzing any number of objects of manufacture.

What is claimed is:

1. A method of inspecting an object with a machine vision system comprising the steps of:

acquiring at least one training image of at least one known good sample representing said object;

generating a training model from said at least one training image;

acquiring a runtime image of said object;

finding said training model in said runtime image at an appropriate position and rotation (x, y, theta);

aligning said runtime image with said training model or aligning said training model with said runtime image to form an aligned runtime image;

performing a geometric transform on said aligned runtime image to form an aligned runtime instance; and performing a feature-based comparison of said aligned runtime instance and said training model to identify extra features and missing features as potential defect data.

2. The method according to claim 1 further comprising the step of:

measuring a displacement, scale and angle of rotation of said object relative to said training model by using a rotation invariant scale invariant method.

3. The method according to claim 2 wherein said object comprises at least one semiconductor die.

4. The method according to claim 1 wherein said object comprises at least one lead frame.

5. The method according to claim 2 further comprising the steps of:

performing a golden template comparison of said aligned runtime instance and said training model to generate second potential defect data; and merging said second potential defect data with said potential defect data.

6. The method according to claim 1 wherein said step of aligning said runtime image further comprises a step of performing a one-point alignment of said runtime image.

7. The method according to claim 1 wherein said geometric transform comprises an affine transform.

8. A method of inspecting adhesive wet-out in a semiconductor die assembly comprising the steps of:

acquiring a training image of a known good sample representing semiconductor die and adhesive wet out;

generating a training model from said training image;

acquiring a runtime image of a semiconductor die and adhesive wet out;

aligning said runtime image with said training image by using a rotation invariant scale invariant method;

determining alignment parameters comprising displacement, scale and rotation of said runtime image;

locating an edge of a die using said alignment parameters;

detecting adhesive wet out in said runtime image;

determining a width of said adhesive wet out; and comparing said width with pre selected tolerance limits.

* * * * *